US012582108B2

(12) United States Patent (10) Patent No.: US 12,582,108 B2

Hammond (45) Date of Patent: Mar. 24, 2026

(54) TELESCOPING LURE RETRIEVAL TOOL

(71) Applicant: Jack Hammer Outdoors LLC, Cincinnati, OH (US)

(72) Inventor: Jack Hammond, Cincinnati, OH (US)

(73) Assignee: Jack Hammer Outdoors LLC, Cincinnati, OH (US)

( * ) Notice: Subject to any disclaimer, the term of this patent is extended or adjusted under 35 U.S.C. 154(b) by 0 days.

(21) Appl. No.: 18/196,648

(22) Filed: May 12, 2023

(65) Prior Publication Data

US 2023/0371490 A1 Nov. 23, 2023

Related U.S. Application Data

(60) Provisional application No. 63/343,352, filed on May 18, 2022.

(51) Int. Cl.
 *A01K 97/24* (2006.01)

(52) U.S. Cl.
 CPC .................................... *A01K 97/24* (2013.01)

(58) Field of Classification Search
 CPC ......... A01K 97/24; A01K 97/00; A01K 97/18
 See application file for complete search history.

(56) References Cited

U.S. PATENT DOCUMENTS

| 1,210,845 | A | * | 1/1917 | Roth | ...................... | A01K 91/04 |
| | | | | | | 289/17 |
| 1,851,370 | A | * | 3/1932 | Munger | ................. | A01K 97/24 |
| | | | | | | 43/25 |

| 2,553,173 | A | * | 5/1951 | Consolo | ................. | A01K 97/24 |
| | | | | | | 43/17.2 |
| 2,828,570 | A | * | 4/1958 | Bradbury | ............... | A01K 97/24 |
| | | | | | | 43/17.2 |
| 2,861,377 | A | * | 11/1958 | Childress | ............... | A01K 97/24 |
| | | | | | | 43/17.2 |
| 2,979,847 | A | * | 4/1961 | Mckinney | .............. | A01K 97/24 |
| | | | | | | 43/17.2 |
| 3,754,290 | A | * | 8/1973 | Nicholson | .............. | A01K 97/00 |
| | | | | | | 30/175 |
| 4,057,925 | A | * | 11/1977 | Wong | ..................... | A01K 97/00 |
| | | | | | | 43/17.2 |
| 4,145,832 | A | * | 3/1979 | Knight, Jr. | ............. | A01K 97/24 |
| | | | | | | 43/17.2 |
| 4,171,587 | A | * | 10/1979 | Bullen, Jr. | ............. | A01K 97/24 |
| | | | | | | 43/17.2 |
| 4,536,984 | A | * | 8/1985 | Kowal | ................... | A01K 97/00 |
| | | | | | | 43/17.2 |
| 4,823,498 | A | * | 4/1989 | Banta | ..................... | A01K 97/00 |
| | | | | | | 43/25 |

(Continued)

FOREIGN PATENT DOCUMENTS

GB 2423454 A * 8/2006 ............. A01K 97/00

*Primary Examiner* — Peter M Poon
*Assistant Examiner* — Carly W. Lynch
(74) *Attorney, Agent, or Firm* — Neo IP

(57) ABSTRACT

A fishing lure retrieval tool includes different attachment heads able to be attached to the end of a telescoping rod. One attachment head includes a line guide, a hook grabbing region, and a line cutting tool for separating a fishing lure from fishing line. Another attachment head includes a U-shaped engagement region configured to knock stuck fishing lures loose, wherein the U-shaped engagement region is ferromagnetic such that it is able to attract and attach to fishing lures.

13 Claims, 14 Drawing Sheets

(56)         References Cited

U.S. PATENT DOCUMENTS

| | | | | |
|---|---|---|---|---|
| 4,896,422 | A * | 1/1990 | Sheehan | A01K 97/00 |
| | | | | 30/296.1 |
| 5,025,585 | A * | 6/1991 | Powell | A01K 97/00 |
| | | | | 43/25 |
| 5,076,002 | A * | 12/1991 | Kelly | A01K 97/00 |
| | | | | 43/17.2 |
| 5,125,180 | A * | 6/1992 | Dean | A01K 97/00 |
| | | | | 43/4 |
| 5,216,828 | A * | 6/1993 | Langstone | A01K 97/24 |
| | | | | 43/17.2 |
| 5,615,511 | A * | 4/1997 | Crane | A01K 97/24 |
| | | | | 43/26.1 |
| 5,628,538 | A | 5/1997 | Ericksen | |
| 5,724,762 | A * | 3/1998 | Thompson | A01K 97/24 |
| | | | | 43/17.2 |
| 6,681,514 | B1 * | 1/2004 | Jursik | A01K 97/00 |
| | | | | 289/17 |
| 8,539,711 | B2 | 9/2013 | Leuckel | |
| 9,220,253 | B2 | 12/2015 | Cepulonis et al. | |
| 10,034,469 | B2 | 7/2018 | Olexson | |
| 11,759,963 | B1 * | 9/2023 | Warner | B25G 1/102 |
| | | | | 7/106 |
| 2013/0180157 | A1 * | 7/2013 | Doucet | A01K 97/00 |
| | | | | 43/25 |
| 2015/0327528 | A1 * | 11/2015 | O'Neal | D03J 3/00 |
| | | | | 289/17 |
| 2016/0270383 | A1 * | 9/2016 | O'Neal | A01K 97/00 |
| 2018/0027789 | A1 * | 2/2018 | Snopkowski | A01K 87/007 |
| 2018/0213762 | A1 * | 8/2018 | Peters | A01K 97/24 |
| 2021/0068381 | A1 * | 3/2021 | Cutler | B25F 1/00 |
| 2023/0232809 | A1 * | 7/2023 | Andriuskevicius | A01K 97/24 |

* cited by examiner

TELESCOPING LURE RETRIEVAL TOOL

CROSS REFERENCES TO RELATED APPLICATIONS

This application is related to and claims priority from the following US patent applications. This application claims priority to and the benefit of U.S. Provisional Application No. 63/343,352, filed May 18, 2022, which is incorporated herein by reference in its entirety.

BACKGROUND OF THE INVENTION

1. Field of the Invention

The present invention relates to a tool for retrieving fishing lures stuck above the surface of the water or below the surface of the water, and more specifically to telescoping tools having multiple removable attachments.

2. Description of the Prior Art

It is generally known in the prior art to provide lure retrieval devices. One type of lure retrieval device includes a telescoping rod attached to, for example, a spiraled end for engaging with a lure. Some lure retrieval devices, such as those offered by CATCH A LURE, are designed to attach to fishing rods and include mechanisms for cutting a fishing line and sometimes include magnets for attracting the lure.

Prior art patent documents include the following:

U.S. Pat. No. 9,220,253 for Lost and abandoned fishing tackle recovery system by inventors Cepulonis et al., filed Aug. 12, 2013 and issued Dec. 29, 2015, discloses a recovery device comprising a pole with a handle to which length extensions may be mounted. Two top attachments. One for recovering tackle from trees having two longitudinal square shafts with magnets attached to their upper face; said shafts bending vertically toward a square attachment front side with magnets attached to the face thereof with razor points at the tips; a flashlight mounted on its underbelly and a back attachment mounted horizontally having a fibrous sheet for securing tackle during retrieval. A second underwater attachment comprising a stem with the top of the stem having a vertical round shaft protruding from its center; a magnet mounted on the bottom side of said vertical face of the round shaft extending from the face of the shaft rearward along the bottom side, with a magnet mounted on the front face and a split ring attached to the top of the face extending vertically.

U.S. Pat. No. 10,034,469 for Fishing lure retrieval apparatus and method by inventor Olexson, filed Sep. 18, 2015 and issued Jul. 31, 2018, discloses a device for assisting a fisherman in retrieving stranded or snagged fishing lures that can be attached to the end of a fishing rod. The device has a number of mechanisms of attachment to prevent the device from parting with the fishing rod during the retrieval process. On one end of the device is a component that has a cutting surface with a magnet located in a proximity thereto. The fishing lure is attracted to the magnet, adhering it to the device. The fishing line can then be cut using the cutting surface. Thus, the fishing lure is quickly freed without damaging the fishing tackle or causing bodily injury. The device can then be removed and the fishing lure retied to the fishing line.

U.S. Pat. No. 8,539,711 for Fishing lure retrieving apparatus by inventor Leuckel, filed Apr. 15, 2011 and issued Sep. 24, 2013, discloses a fishing lure retrieving device. Versions of the invention utilize a body with a cavity and handle, a sleeve movably connected to the body, a cutter and closing line. Optional telescoping handle(s), magnet(s), closing fastener(s), sleeve end cap(s) and/or body end cap(s) may also be used with versions of the invention.

U.S. Pat. No. 5,628,538 for Extensible wading staff with retractable hook by inventor Ericksen, filed Oct. 27, 1994 and issued May 13, 1997, discloses an extensible wading staff including an elongate shaft with first and second ends, a gripping area, a retractable hook near the first end, and a foot structure such as a rubber cap on the sealed end. A fisherman who is in water, especially moving water, may use the wading staff to maintain his balance while he is flyfishing. In addition, a fisherman may use the staff to help him retrieve snagged fishing devices such as flies, lures, lines and hooks from overhanging tree branches or underwater obstacles.

SUMMARY OF THE INVENTION

The present invention relates to a tool for retrieving fishing lures stuck above the surface of the water or below the surface of the water, and more specifically to telescoping tools having multiple removable attachments.

It is an object of this invention to assist fishermen in retrieving stuck lures such that the lures are not left to harm wildlife and such that fishermen do not lose their equipment.

In one embodiment, the present invention is directed to a fishing lure retrieval device including a body, and an attachment portion, wherein a first end of the body is attached to a first end of the attachment portion, wherein the body includes a protrusion configured to frictionally engage with one or more hooks of a fishing lure, wherein the body includes a recessed blade at the second end of the body, wherein the recessed blade is configured to cut a portion of a fishing line, and wherein the attachment portion is configured to attach to a rod to provide extended reach for the fishing lure retrieval device. In one embodiment, the protrusion configured to frictionally engage with the one or more hooks of the fishing lure includes one or more openings. In one embodiment, the protrusion configured to frictionally engage with the one or more hooks of the fishing lure is orthogonally attached to the body. In one embodiment, the protrusion configured to frictionally engage with the one or more hooks of the fishing lure includes a main rectangular component substantially parallel to a first surface of the body and additional rectangular components substantially perpendicular to the first surface of the body and substantially perpendicular to the main rectangular component. The body further comprises a line guide protrusion on an opposite side of the body from the protrusion configured to frictionally engage with the one or more hooks of the fishing lure. In one embodiment, the line guide protrusion is an L-shaped component. In one embodiment, the body further comprises a surface between the protrusion configured to frictionally engage with the one or more hooks of the fishing lure and the body which has a higher coefficient of friction than the body. The device does not include a magnet. In one embodiment, the body is tapered at the second end of the body. In one embodiment, the rod is not a fishing rod.

In another embodiment, the present invention is directed to a fishing lure retrieval device including a body including a protrusion configured to frictionally engage with one or more hooks of a fishing lure, wherein the body includes a recessed blade, wherein the recessed blade is configured to cut a fishing line, and wherein the protrusion configured to frictionally engage with the one or more hooks of the fishing lure includes a main rectangular component substantially parallel to a first surface of the body and additional rectangular components substantially perpendicular to the first surface of the body and substantially perpendicular to the main rectangular component. In one embodiment, the protrusion configured to frictionally engage with the one or more hooks of the fishing lure is orthogonally attached to the body. In one embodiment, the body further comprises a line guide protrusion on an opposite side of the body from the protrusion configured to frictionally engage with the one or more hooks of the fishing lure. In one embodiment, the line guide protrusion is an L-shaped component. In one embodiment, the body further comprises a surface between the protrusion configured to frictionally engage with the one or more hooks of the fishing lure and the body which has a higher coefficient of friction than the body. In one embodiment, the device does not include a magnet. In one embodiment, the rod is not a fishing rod.

In yet another embodiment, the present invention is directed to a fishing lure retrieval device including a body, and an attachment portion, wherein a first end of the body is attached to a first end of the attachment portion, wherein the body includes a protrusion configured to frictionally engage with one or more hooks of a fishing lure, wherein the body includes a surface between the protrusion configured to frictionally engage with the one or more hooks of the fishing lure and the body which has a higher coefficient of friction than the body, wherein the body includes a recessed blade at the second end of the body, wherein the body includes a line guide protrusion on an opposite side of the body from the protrusion configured to frictionally engage with the one or more hooks of the fishing lure, wherein the line guide protrusion is an L-shaped component, wherein the recessed blade is configured to cut a portion of a fishing line, wherein the attachment portion is configured to attach to a rod to provide extended reach for the fishing lure retrieval device, wherein the protrusion configured to frictionally engage with the one or more hooks of the fishing lure includes one or more openings, wherein the protrusion configured to frictionally engage with the one or more hooks of the fishing lure is orthogonally attached to the body, wherein the protrusion configured to frictionally engage with the one or more hooks of the fishing lure includes a main rectangular component substantially parallel to a first surface of the body and additional rectangular components substantially perpendicular to the first surface of the body and substantially perpendicular to the main rectangular component. In one embodiment, the body is hollow. In one embodiment, the device does not include a magnet.

These and other aspects of the present invention will become apparent to those skilled in the art after a reading of the following description of the preferred embodiment when considered with the drawings, as they support the claimed invention.

BRIEF DESCRIPTION OF THE DRAWINGS

Figure 6:
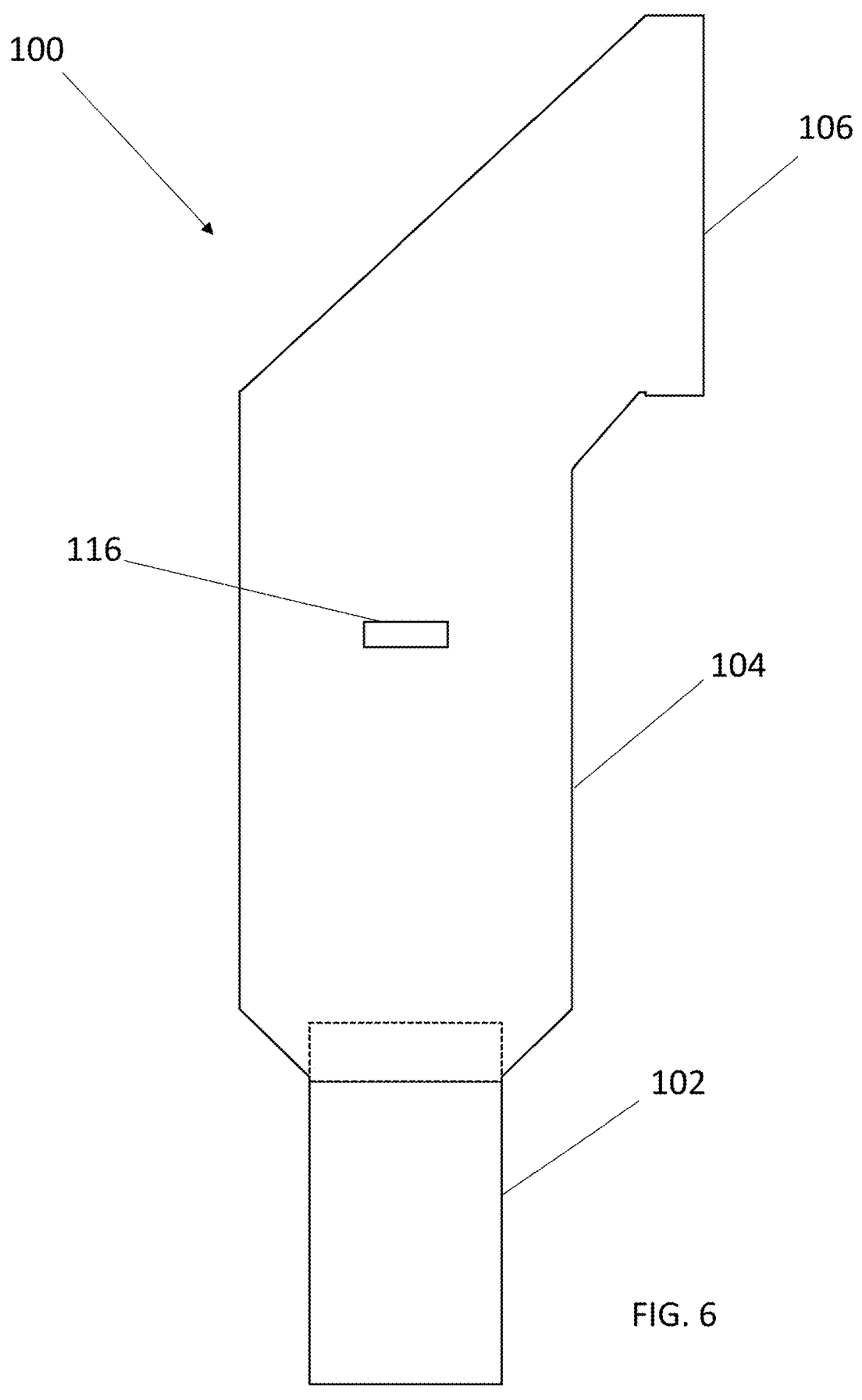

FIG. 6 illustrates a right side orthogonal view of an above-water lure retrieval attachment according to one embodiment of the present invention.

DETAILED DESCRIPTION

Figure 1:
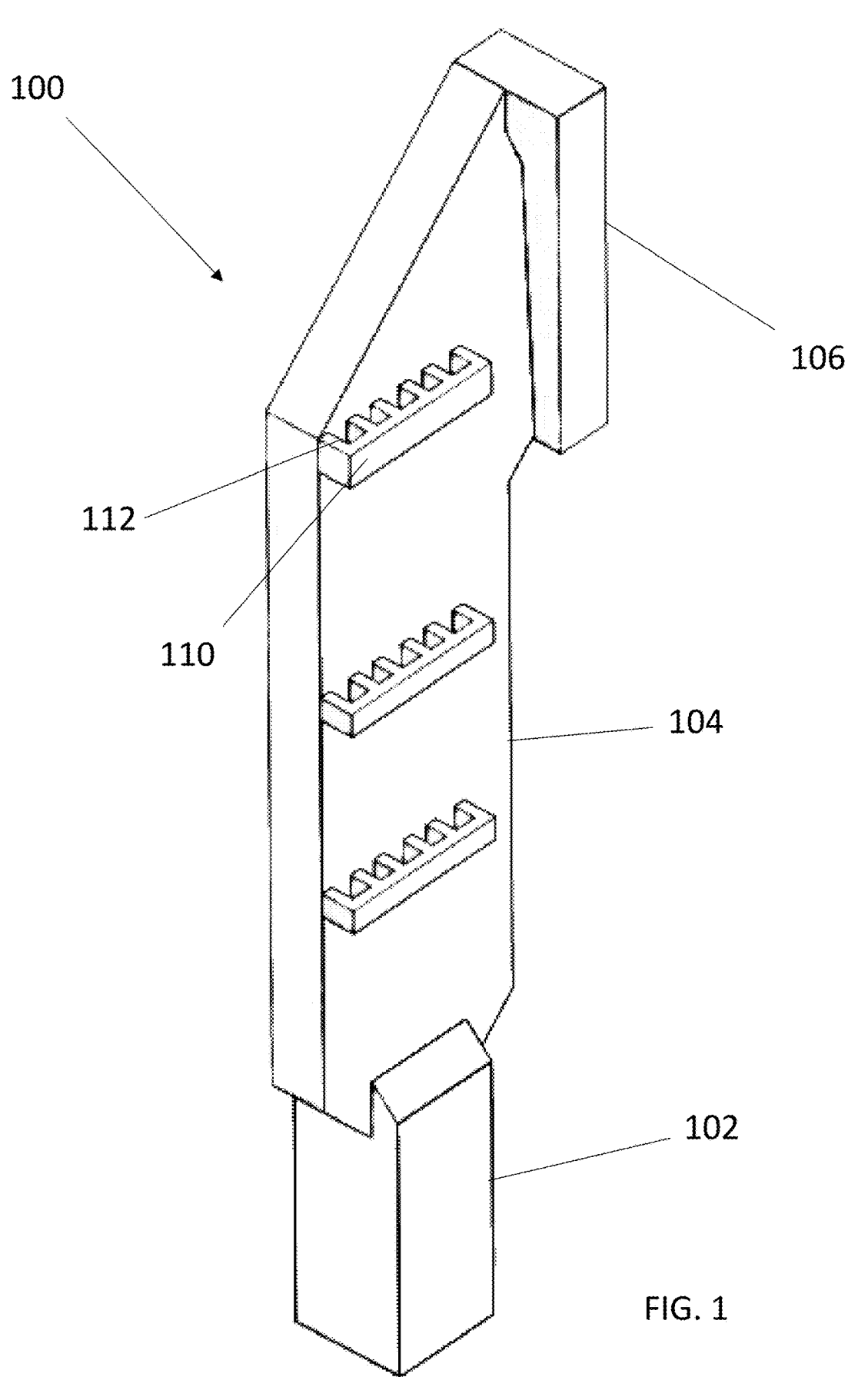
FIG. 1 illustrates a front perspective view of an above-water lure retrieval attachment according to one embodiment of the present invention.
Figure 2:
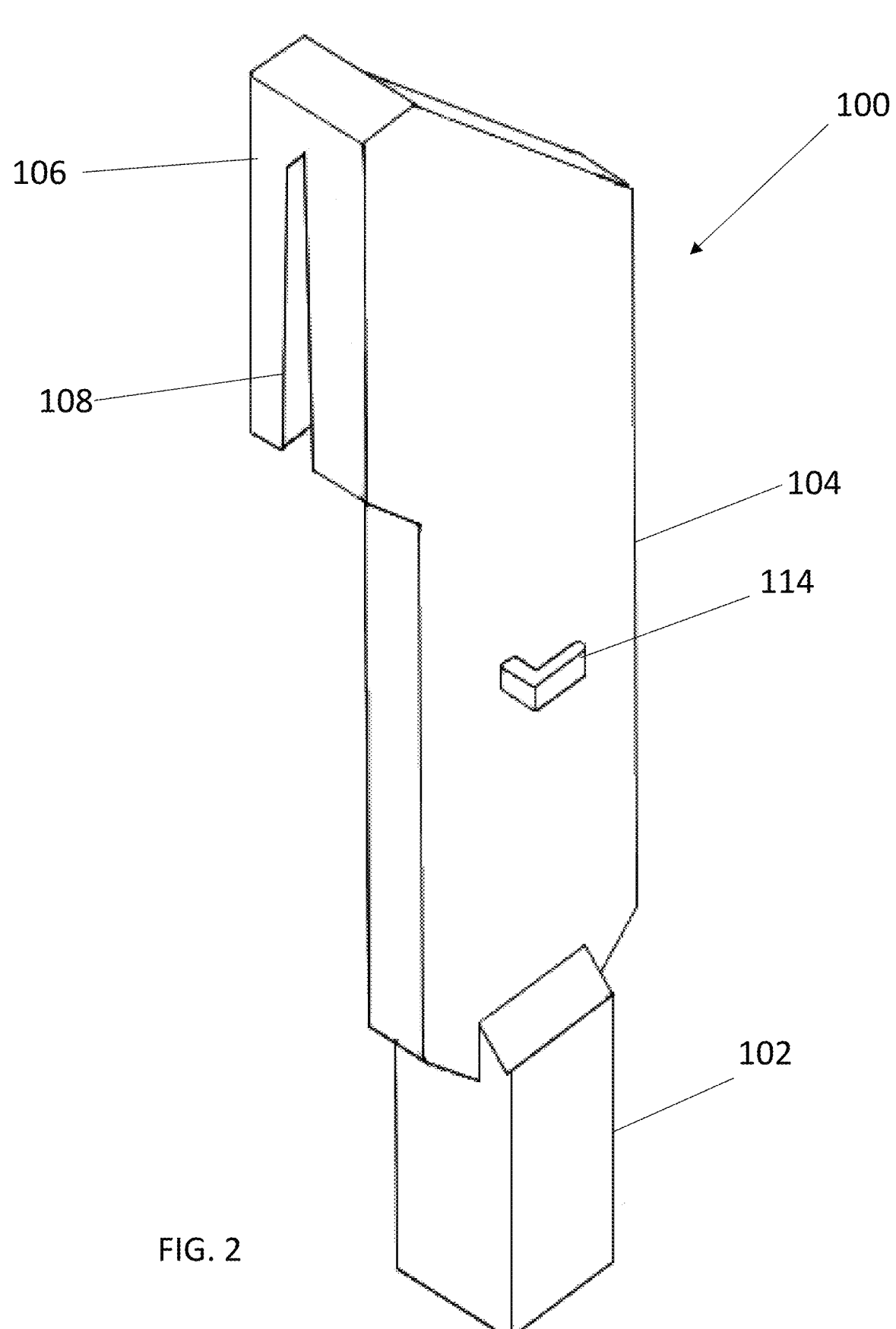
FIG. 2 illustrates a back perspective view of an above-water lure retrieval attachment according to one embodiment of the present invention.
Figure 3:
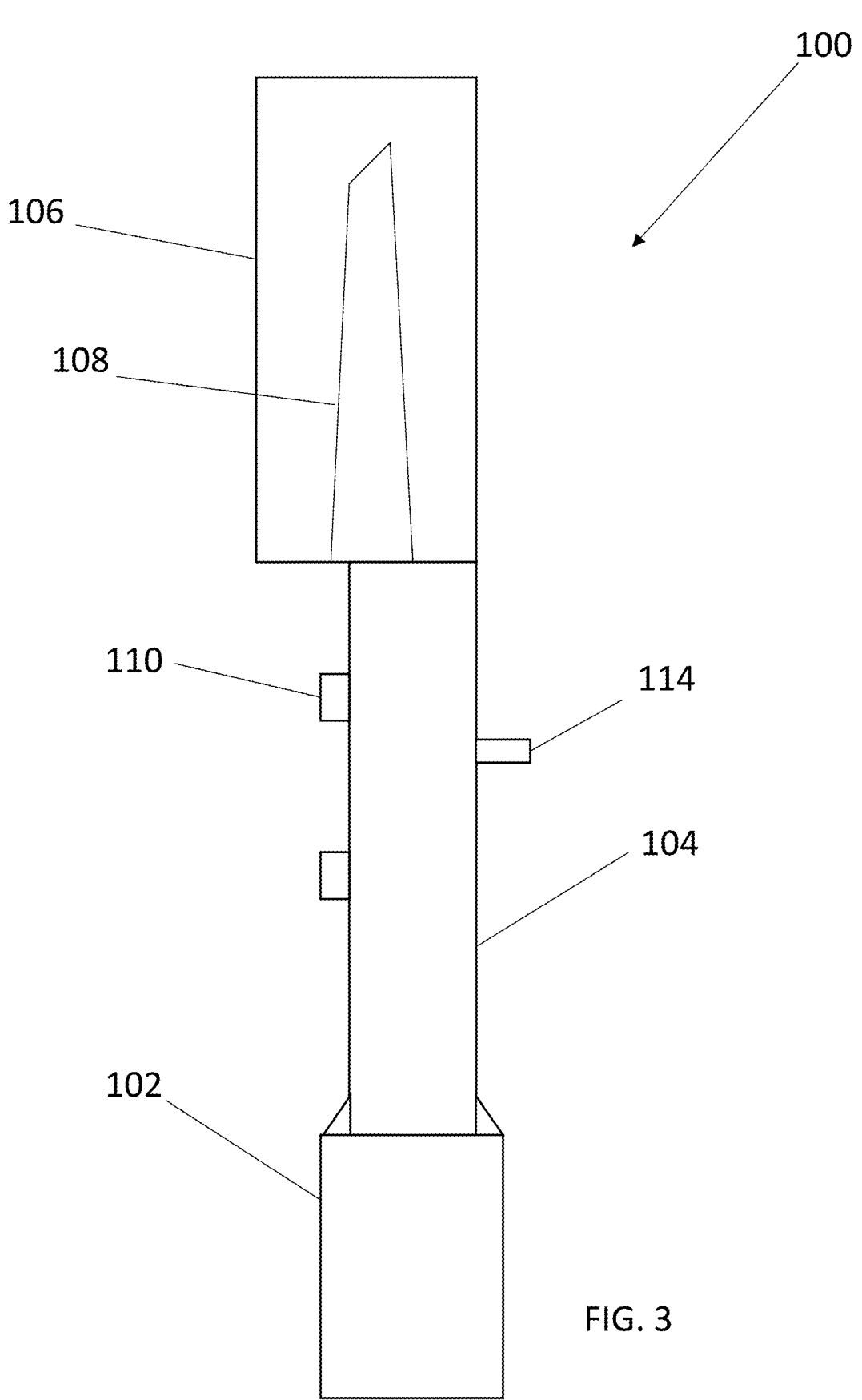
FIG. 3 illustrates a front orthogonal view of an above-water lure retrieval attachment according to one embodiment of the present invention.
Figure 4:
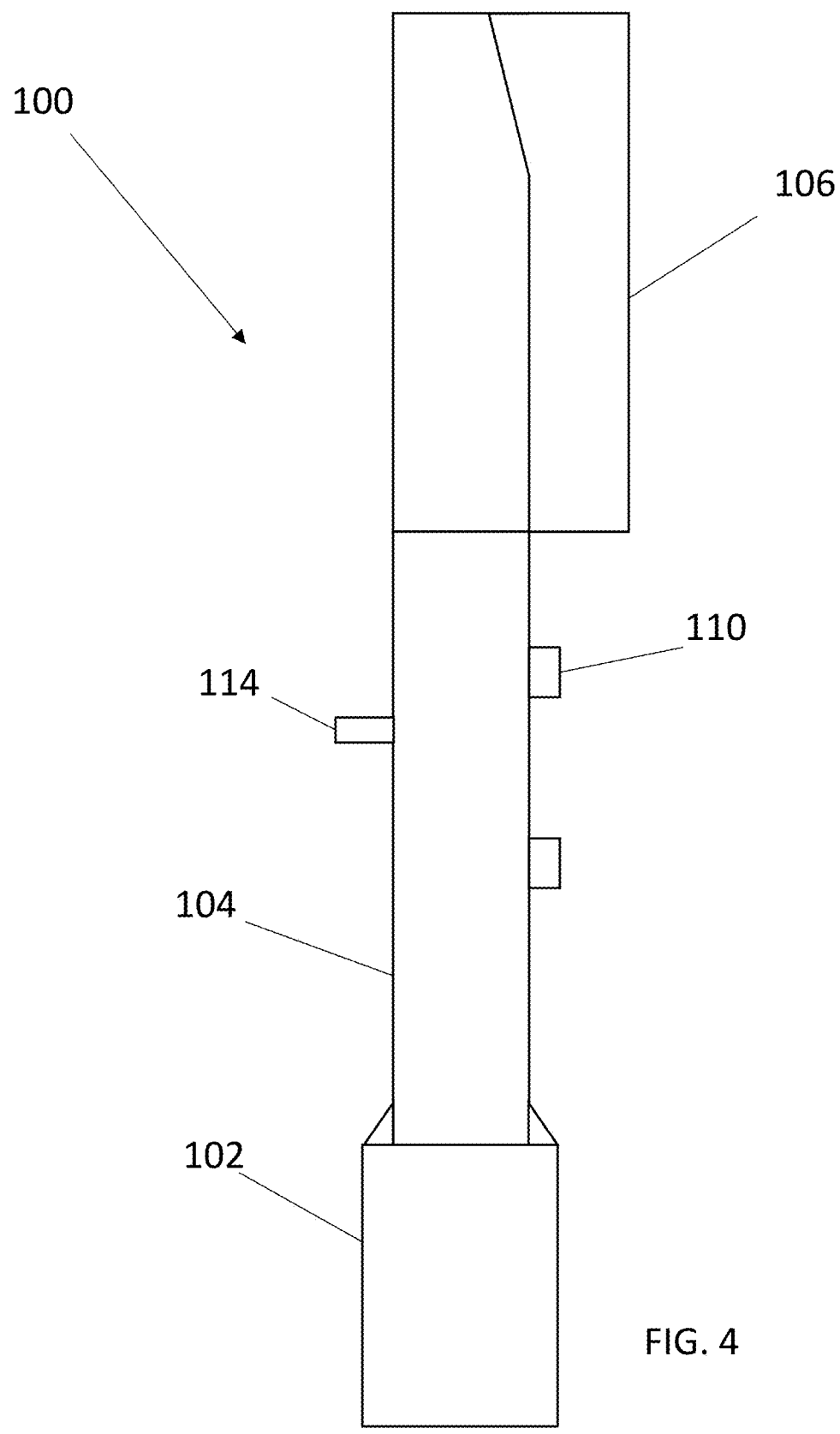
FIG. 4 illustrates a back orthogonal view of an above-water lure retrieval attachment according to one embodiment of the present invention.
Figure 5:
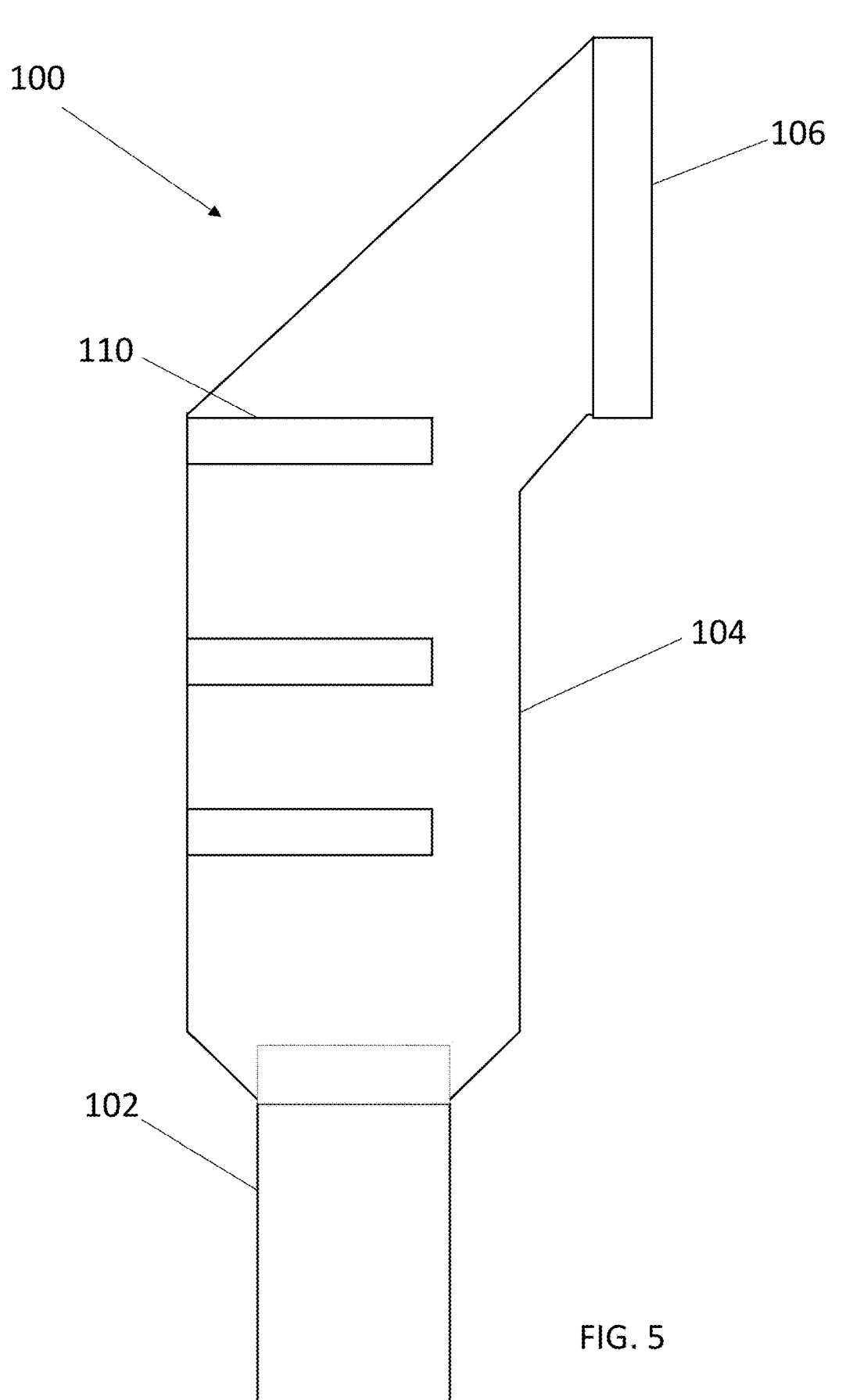
FIG. 5 illustrates a left side orthogonal view of an above-water lure retrieval attachment according to one embodiment of the present invention.
Figure 7:
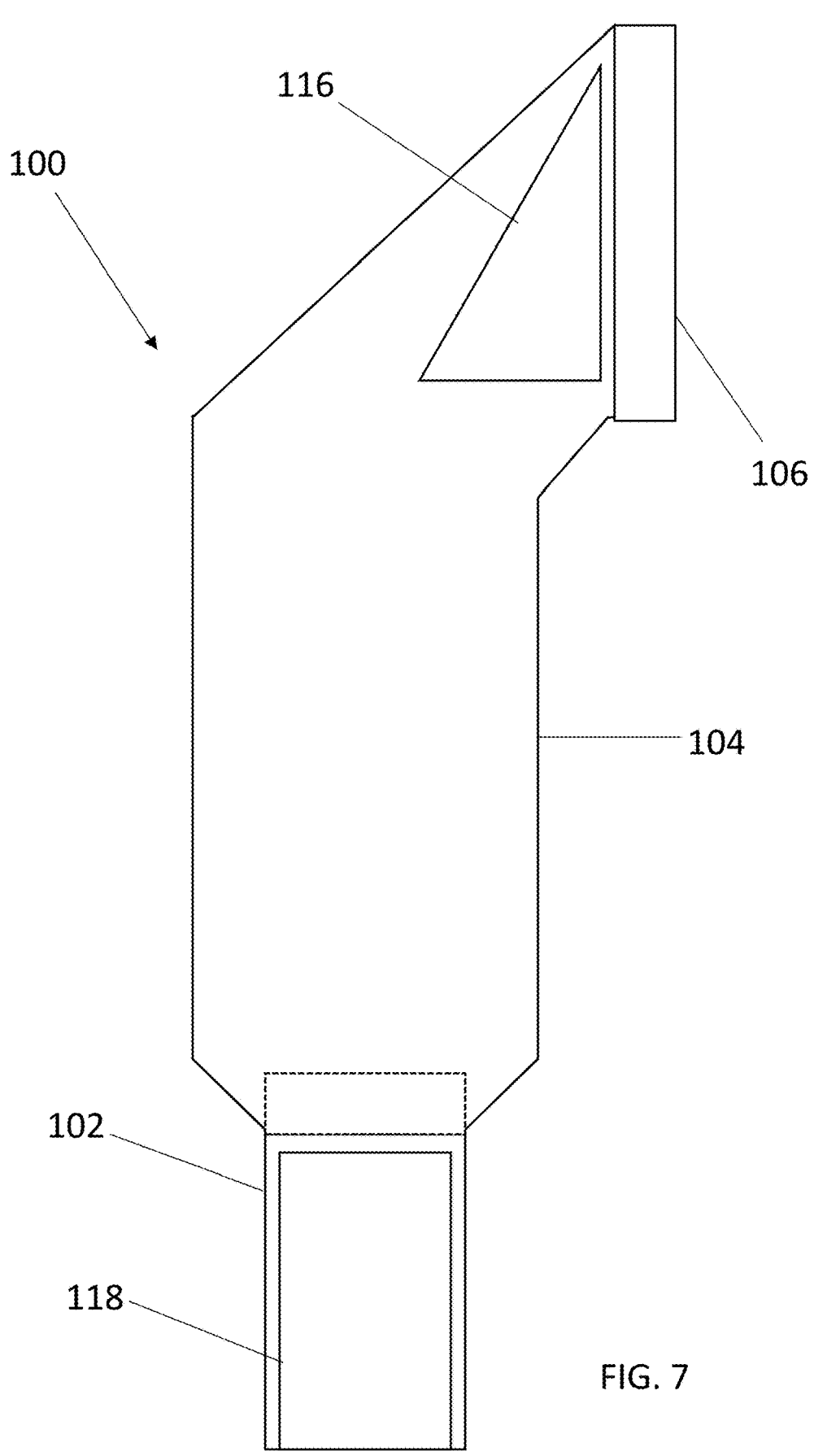
FIG. 7 illustrates a left side sectional view of an above-water lure retrieval attachment according to one embodiment of the present invention.
Figure 8:
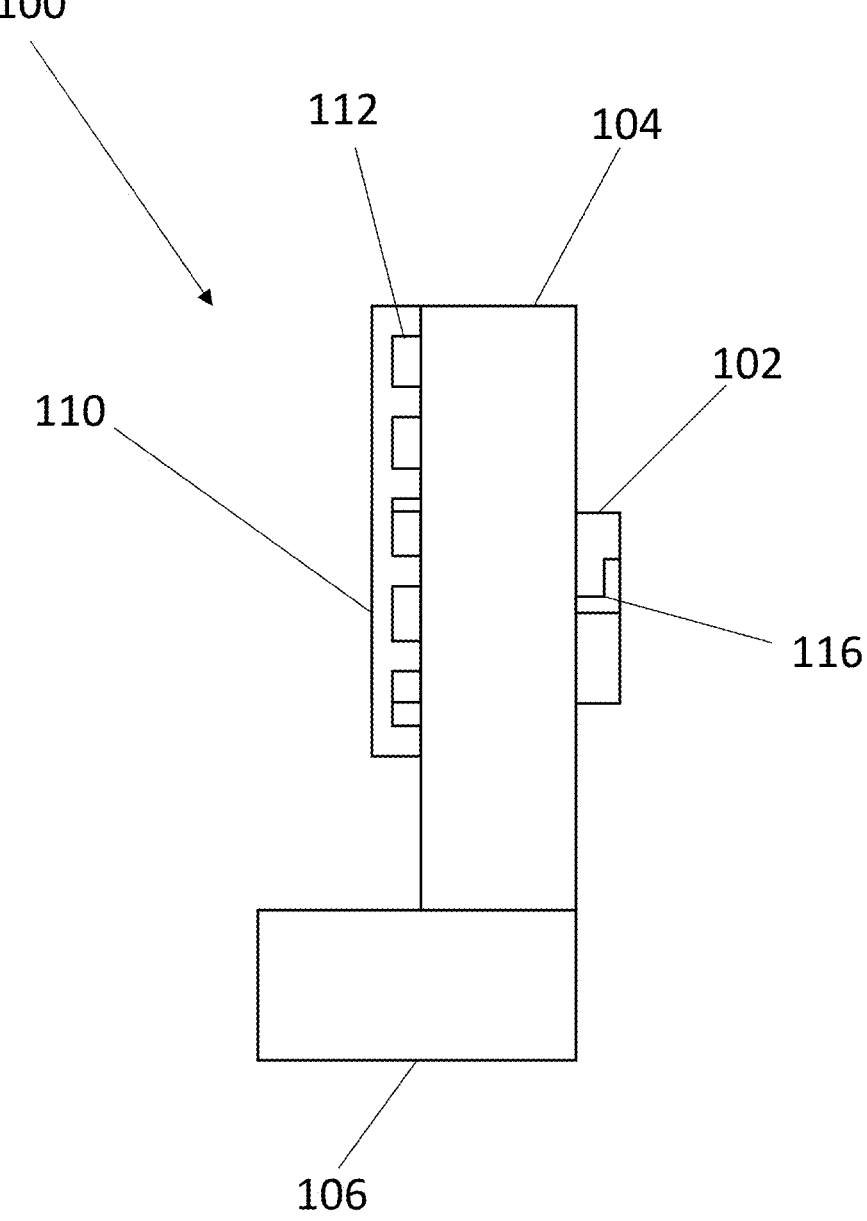
FIG. 8 illustrates a top orthogonal view of an above-water lure retrieval attachment according to one embodiment of the present invention.

The present invention is generally directed to a tool for retrieving fishing lures stuck above the surface of the water or below the surface of the water, and more specifically to telescoping tools having multiple removable attachments.

In one embodiment, the present invention is directed to a fishing lure retrieval device including a body, and an attachment portion, wherein a first end of the body is attached to a first end of the attachment portion, wherein the body includes a protrusion configured to frictionally engage with one or more hooks of a fishing lure, wherein the body includes a recessed blade at the second end of the body, wherein the recessed blade is configured to cut a portion of a fishing line, and wherein the attachment portion is configured to attach to a rod to provide extended reach for the fishing lure retrieval device. In one embodiment, the protrusion configured to frictionally engage with the one or more hooks of the fishing lure includes one or more openings. In one embodiment, the protrusion configured to frictionally engage with the one or more hooks of the fishing lure is orthogonally attached to the body. In one embodiment, the protrusion configured to frictionally engage with the one or more hooks of the fishing lure includes a main rectangular component substantially parallel to a first surface of the body and additional rectangular components substantially perpendicular to the first surface of the body and substantially perpendicular to the main rectangular component. The body further comprises a line guide protrusion on an opposite side of the body from the protrusion configured to frictionally engage with the one or more hooks of the fishing lure. In one embodiment, the line guide protrusion is an L-shaped component. In one embodiment, the body further comprises a surface between the protrusion configured to frictionally engage with the one or more hooks of the fishing lure and the body which has a higher coefficient of friction than the body. The device does not include a magnet. In one embodiment, the body is tapered at the second end of the body. In one embodiment, the rod is not a fishing rod.

In another embodiment, the present invention is directed to a fishing lure retrieval device including a body including a protrusion configured to frictionally engage with one or more hooks of a fishing lure, wherein the body includes a recessed blade, wherein the recessed blade is configured to cut a fishing line, and wherein the protrusion configured to frictionally engage with the one or more hooks of the fishing lure includes a main rectangular component substantially parallel to a first surface of the body and additional rectangular components substantially perpendicular to the first surface of the body and substantially perpendicular to the main rectangular component. In one embodiment, the protrusion configured to frictionally engage with the one or more hooks of the fishing lure is orthogonally attached to the body. In one embodiment, the body further comprises a line guide protrusion on an opposite side of the body from the protrusion configured to frictionally engage with the one or more hooks of the fishing lure. In one embodiment, the line guide protrusion is an L-shaped component. In one embodiment, the body further comprises a surface between the protrusion configured to frictionally engage with the one or more hooks of the fishing lure and the body which has a higher coefficient of friction than the body. In one embodiment, the device does not include a magnet. In one embodiment, the rod is not a fishing rod.

In yet another embodiment, the present invention is directed to a fishing lure retrieval device including a body, and an attachment portion, wherein a first end of the body is attached to a first end of the attachment portion, wherein the body includes a protrusion configured to frictionally engage with one or more hooks of a fishing lure, wherein the body includes a surface between the protrusion configured to frictionally engage with the one or more hooks of the fishing lure and the body which has a higher coefficient of friction than the body, wherein the body includes a recessed blade at the second end of the body, wherein the body includes a line guide protrusion on an opposite side of the body from the protrusion configured to frictionally engage with the one or more hooks of the fishing lure, wherein the line guide protrusion is an L-shaped component, wherein the recessed blade is configured to cut a portion of a fishing line, wherein the attachment portion is configured to attach to a rod to provide extended reach for the fishing lure retrieval device, wherein the protrusion configured to frictionally engage with the one or more hooks of the fishing lure includes one or more openings, wherein the protrusion configured to frictionally engage with the one or more hooks of the fishing lure is orthogonally attached to the body, wherein the protrusion configured to frictionally engage with the one or more hooks of the fishing lure includes a main rectangular component substantially parallel to a first surface of the body and additional rectangular components substantially perpendicular to the first surface of the body and substantially perpendicular to the main rectangular component. In one embodiment, the body is hollow. In one embodiment, the device does not include a magnet.

A common issue during fishing is for lures to become caught in trees. This most common occurs during casting. Lures also commonly become lost during fishing, especially if the lure is improperly attached to the fishing line or the fishing line snaps for some reason. Lost lures are an issue for fishermen, as many fishermen only keep a limited number of lures and lures often have both monetary value and sentimental value. Furthermore, lost lures present an ecological issue, as fish and other organisms will accidentally get caught on the lost lure and have no human to remove the lures, as during fishing.

Inventors have attempted to solve the issue of lost lures in various ways. One solution is to use a telescoping rod to reach a lure and snag the lure on a spiral-like attachment. Some solutions utilize a separate rod to retrieve the lure, while other solutions attach the lure retrieval mechanism directly to the end of the fishing rod. Magnets are also commonly used, as in devices such as that described in U.S. Pat. No. 9,220,253, in order to attract lures during retrieval. Some devices, such that described in U.S. Pat. No. 10,034, 469, utilize blades to cut fishing line in the proximity of the lure in order to more easily remove the lure.

Existing devices typically use either magnets or a thin spiral-like hook in order to catch a hook. However, variations in the hook of the often cause the spiral-like hook mechanisms to vary significantly in effectiveness, while the potential for non-magnetic hooks renders the magnet solution obsolete in some scenarios. Therefore, attachments adapted for a wider variety of hook sizes and materials are needed.

Referring now to the drawings in general, the illustrations are for the purpose of describing one or more preferred embodiments of the invention and are not intended to limit the invention thereto.

Figure 9:
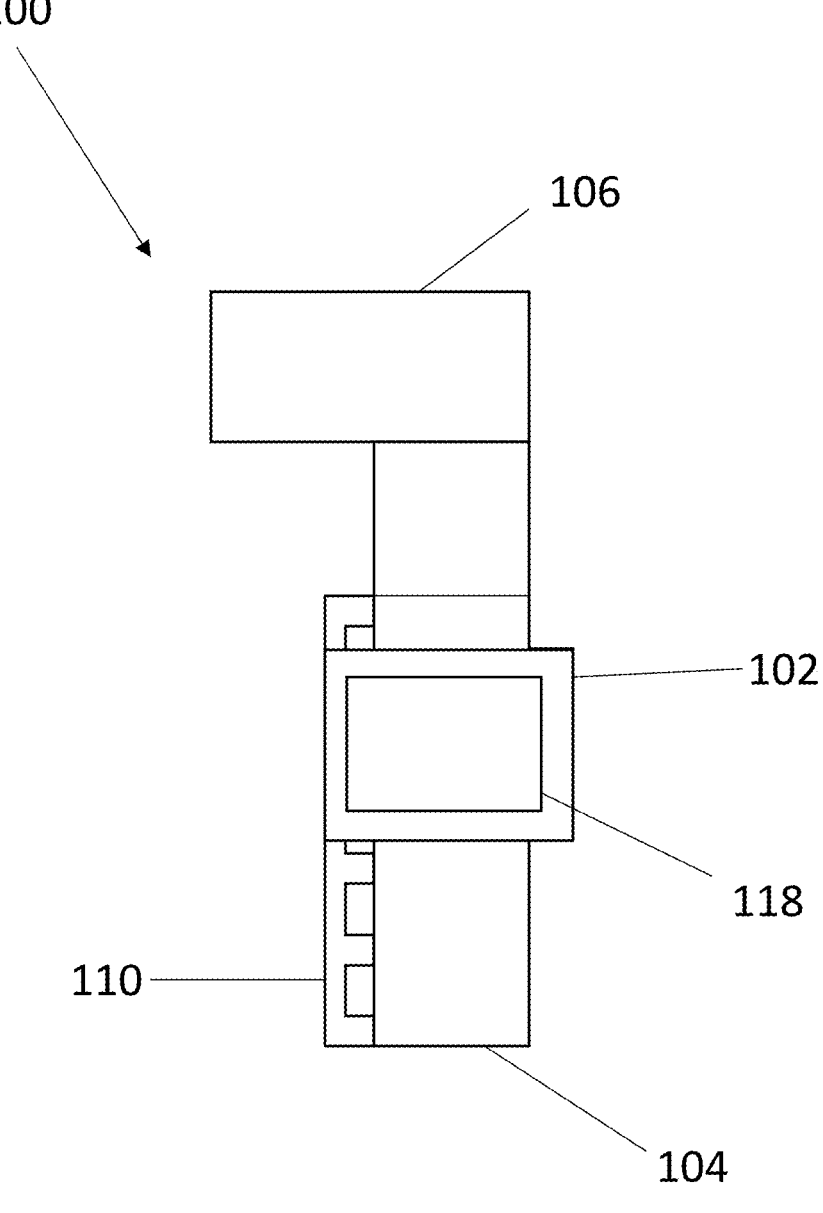
FIG. 9 illustrates a bottom orthogonal view of an above-water lure retrieval attachment according to one embodiment of the present invention.

FIGS. 1-9 illustrate an above-water lure retrieval attachment according to one embodiment of the present invention. The above water lure retrieval attachment 100 includes an attachment portion 102. In one embodiment, the attachment portion 102 is shaped substantially like a hollow rectangular prism, including a hole 118 defined in the bottom of the attachment portion 102 open to the center of the hollow rectangular prism. The hole 118 is sized and configured to receive an end of a telescoping rod or another extending tool in order to connect the above-water lure retrieval attachment 100 to the telescoping rod. In one embodiment, the above-water lure retrieval attachment 100 connects with the telescoping rod through frictional engagement between the end of the telescoping rod and an inner surface of the hole 118. In one embodiment, the above-water lure retrieval attachment 100 includes a hollow portion including internal threading configured to mate with external threading on an outside surface of the telescoping rod. One of ordinary skill in the art will appreciate that the shape of the attachment portion 102 is not limited to a rectangular prism and it is able to take on a variety of shapes including, but not limited to, a cylinder, a triangular prism, or other shapes. Similarly, one of ordinary skill in the art will understand that the shape of the hole 118 is not limited to a square hole, as shown in FIG. 9, and is able to take on a variety of shapes, including circular, triangular, or another shape.

The top of the attachment portion 102 is connected with a main body portion 104. In one embodiment, the main body portion 104 is thinner, but wider than the attachment portion 102, as shown in FIG. 1. In another embodiment, the main body portion 104 is thicker or substantially as thick as the attachment portion 102. In one embodiment, one or more hook engagement protrusions 110 extends outwardly from one or more sides of the main body portion 104. In one embodiment, the one or more hook engagement protrusions 110 are rectangular protrusions, as shown in FIG. 1, but one of ordinary skill in the art will understand that the shape of the protrusions is able to vary. One or more openings 112 are defined in each of the one or more hook engagement protrusions 110. The one or more openings 112 are configured so as to snag the hooks attached to a lure. By including a larger number of openings and/or a larger number of hook engagement protrusions, the chances of having a hook from the lure snag one or more of the protrusions is increased. Therefore, in one embodiment, the main body portion 104 includes three hook engagement protrusions 110, each having 5 openings 112, as shown in FIG. 1, but one of ordinary skill in the art will understand that the number of hook engagement regions and/or the number of openings in each hook engagement regions are able to be varied. In one embodiment, the one or more hook engagement protrusions 110 also include surfaces having hook and loop mechanisms, such that the hook and loop mechanisms help to snag the hooks of the lure on the lure retrieval tool. Importantly, the openings 112 in the hook engagement protrusions 110 are sized to be able to catch a wide variety of hook sizes and non-reliance on magnetic catching mechanisms allows the device to more effectively grab non-magnetic hooks.

In one embodiment, one or more line guide protrusions 114 extend outwardly from one or more sides of the main body portion 104. In one embodiment, the one or more line guide protrusions 114 include a first portion extending substantially orthogonally from the side of the main body portion 104 and a second portion extending substantially orthogonally (e.g., to the left or the right of the main body portion 104) from the end of the first portion. The one or more line guide protrusions 114 are configured to allow the above-water lure retrieval attachment 100 to closely follow a fishing line attached to the caught lure so as to allow the attachment 100 to reach the location of the lure without having to either guess the location of the lure (in the event that such a location is unknown) or accurately position the attachment 100 from a long distance. When in use, the fishing line rests on the first portion of the one or more line guide protrusions 114 while, for example, a telescoping rod is extended such that the attachment 100 is able to reach the lure. One of ordinary skill in the art will understand that although only a single line guide protrusion 114 in shown in FIG. 2, any number of line guide protrusions are able to be added to the attachment 100.

An engagement region 106 is connected to the top of the main body portion 104 of the above-water lure retrieval attachment 100. In one embodiment, the engagement region 106 includes a blade opening 108 for housing a line cutting blade 116. When in use, once the attachment 100 has reached the location of the lure, the blade opening 108 is configured to receive the fishing line, such that the line cutting blade 116 is able to cut the fishing line. In one embodiment, the line cutting blade 116 includes a serrated blade and/or a straight blade. In one embodiment, the line cutting blade 116 includes a plurality of blades (e.g., forming a V-shape) in order to more efficiently cut the fishing line. Preferably, when in use, the line cutting blade 116 is used to cut the fishing line after the lure has engaged with the one or more hook engagement protrusions 110, such that the lure does not drop or otherwise get lost.

Figure 10:
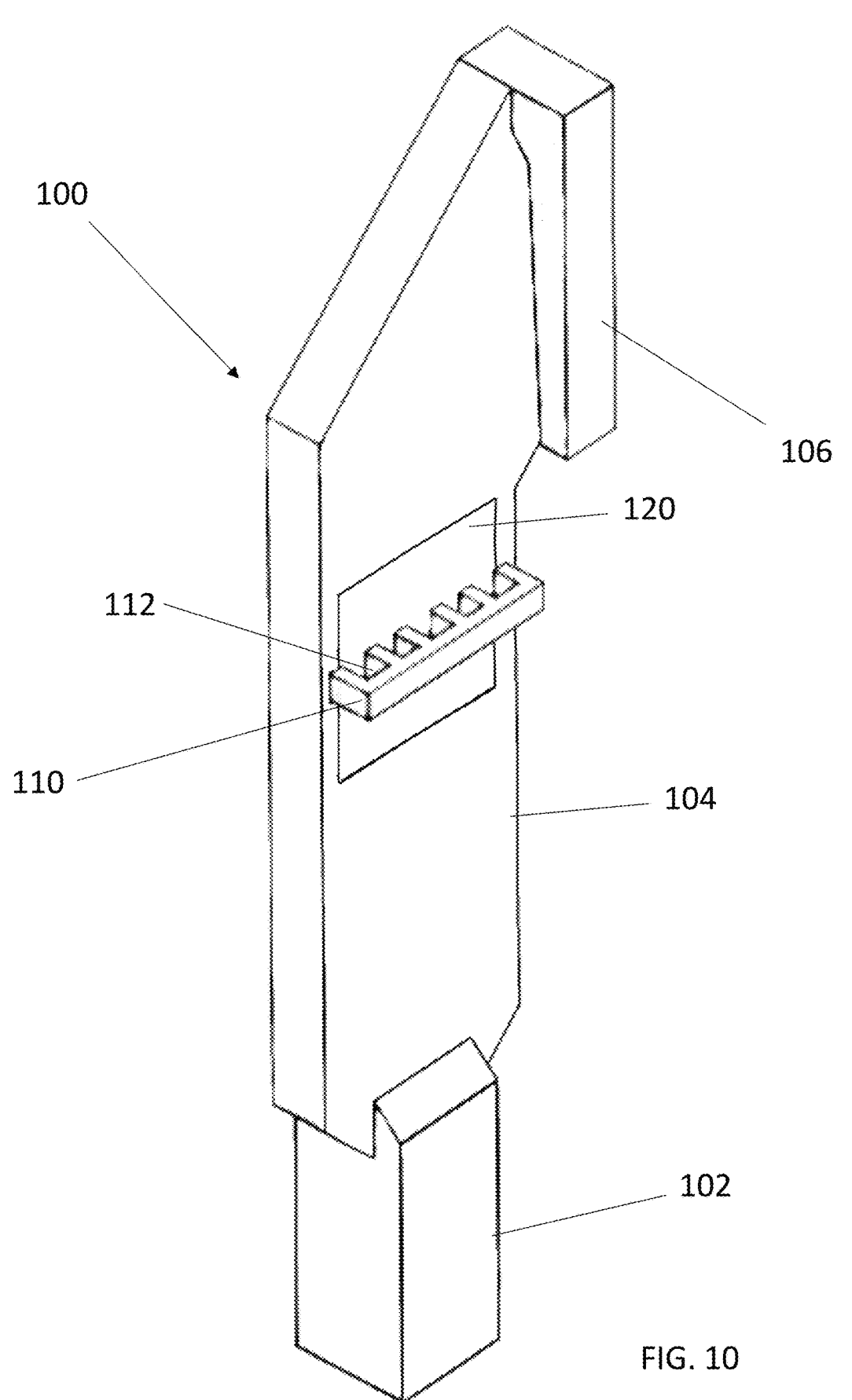
FIG. 10 illustrates a front perspective view of an above-water lure retrieval attachment according to another embodiment of the present invention.

FIG. 10 illustrates a front perspective view of an above-water lure retrieval attachment according to another embodiment of the present invention. The above-water lure retrieval attachment includes a sole hook engagement protrusion 110 in this embodiment consisting of five openings between six protrusions. A hook portion or loop portion of hook and loop tape 120 is positioned beneath the hook engagement protrusion to frictionally engage hooks of a lure when the above-water lure retrieval attachment is in use. Although FIG. 10 illustrates an embodiment with hook and loop tape, any other material or mechanism is operable to be included beneath the engagement protrusion 110 and/or on any other portion of the above-water lure retrieval attachment to provide another surface for frictionally engaging a hook of a lure.

Figure 11:
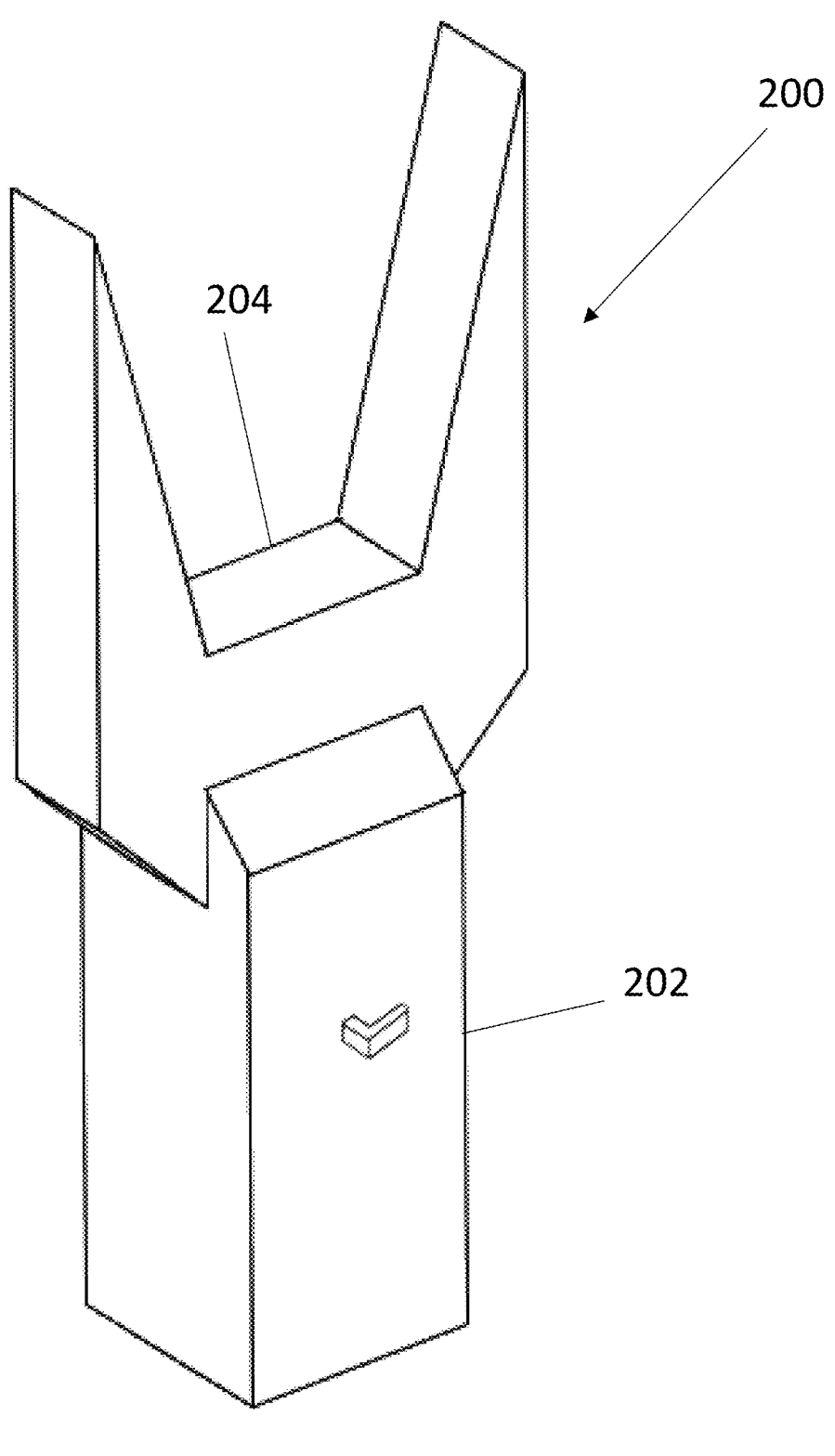
FIG. 11 illustrates a perspective view of a below-water lure retrieval attachment according to one embodiment of the present invention.
Figure 12:
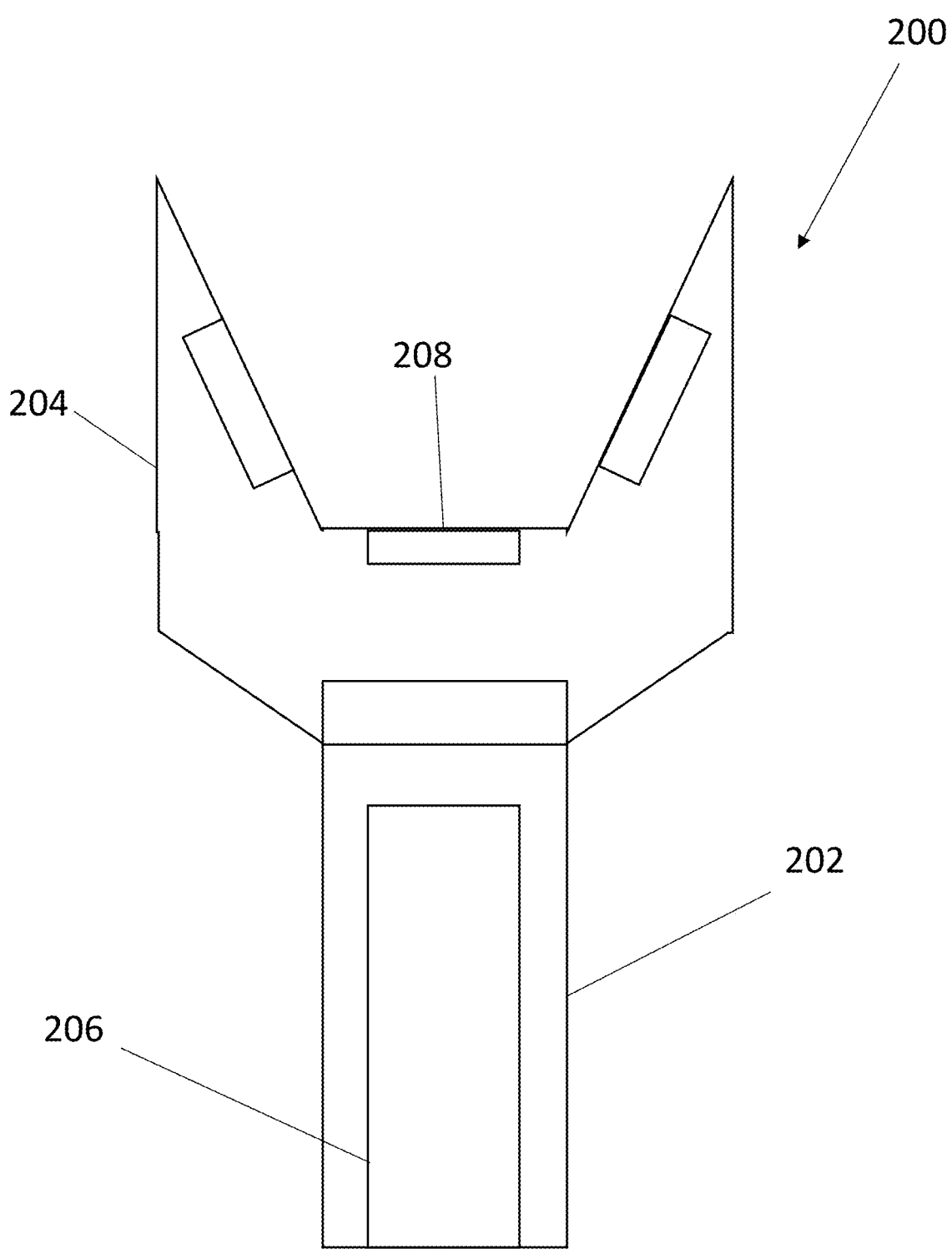
FIG. 12 illustrates a side sectional view of a below-water lure retrieval attachment according to one embodiment of the present invention.

FIGS. 11 and 12 illustrate a below-water lure retrieval attachment according to one embodiment of the present invention. The below-water lure retrieval attachment 200 is used to retrieve lures that have fallen in the water, especially those lures that have become stuck on something beneath the water. The below-water lure retrieval attachment 200 includes a attachment portion 202. In one embodiment, one or more line guide protrusions 210 extend outwardly from one or more sides of the attachment portion 202. In one embodiment, the attachment portion 202 is shaped substantially like a hollow rectangular prism, including a hole 206 defined in the bottom of the attachment portion 202 open to the center of the hollow rectangular prism. The hole 206 is sized and configured to receive an end of a telescoping rod or another extending tool in order to connect the below-water lure retrieval attachment 200 to the telescoping rod. In one embodiment, the below-water lure retrieval attachment 200 connects with the telescoping rod through frictional engagement between the end of the telescoping rod and an inner surface of the hole 206. One of ordinary skill in the art will appreciate that the shape of the attachment portion 202 is not limited to a rectangular prism and it is able to take on a variety of shapes including, but not limited to, a cylinder, a triangular prism, or other shapes. Similarly, one of ordinary skill in the art will understand that the shape of the hole 206 is not limited to a square hole, and is able to take on a variety of shapes, including circular, triangular, or another shape.

The top of the attachment portion 202 is connected with an engagement prong 204. In one embodiment, the engagement prong 204 includes a base with protrusions extending outwardly from two opposite ends of the base. The fork-like shape of the engagement prong 204 is configured to allow the below-water lure retrieval attachment 200 to knock lures free so that they are more easily able to be retrieved. In one embodiment, the engagement prong 204 includes one or more ferromagnets 208. One of ordinary skill in the art will understand that the type and material of the ferromagnet is not intended to be limiting, and materials including iron, cobalt, and nickel are able to be used. In one embodiment, the ferromagnets 208 are exposed to a surface of the engagement prong 204, while, in another embodiment, the ferromagnets 208 are embedded in the engagement prong 204 and are not exposed to the surface of the engagement prong 204. Because most lures include metal, ferromagnetic portions, the inclusion of the ferromagnets 208 in the engagement prong 204 allows the engagement prong 204 to attach to the lure and bring the lure up out of the water. This is rendered easier in the event that the lure has first been knocked free using the engagement prong 204.

Figure 13:
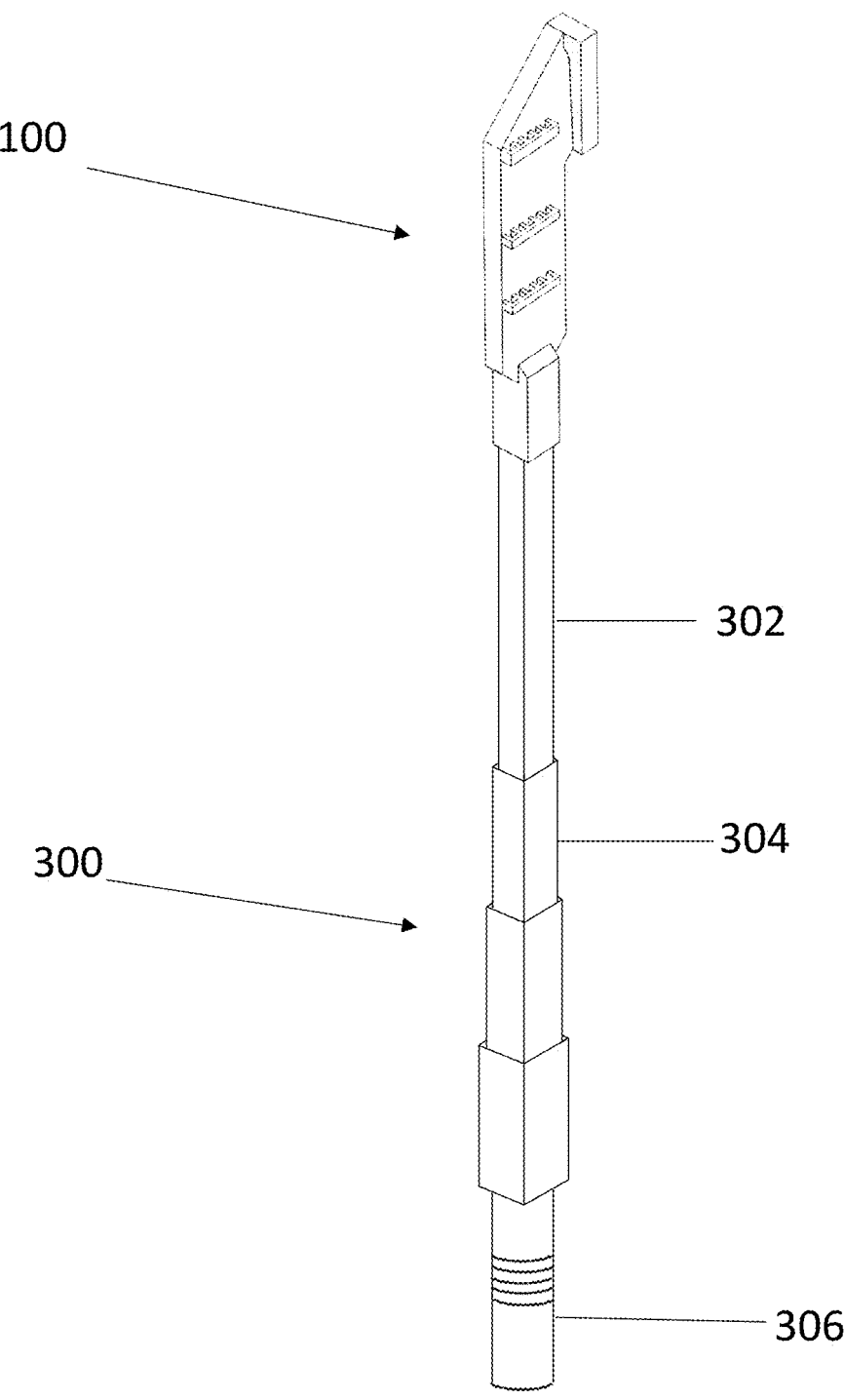
FIG. 13 illustrates an above-water lure retrieval attachment attached to a telescoping rod according to one embodiment of the present invention.

FIG. 13 illustrates an above-water lure retrieval attachment attached to a telescoping rod according to one embodiment of the present invention. In one embodiment, an above-water lure retrieval attachment 100 is attached to one end of a telescoping rod 300. The telescoping rod 300 includes a first extended member 302 operable to slip into or out of a second extended member 304. In one embodiment, the second extended member 304 is able to slip into or out of a third extended member and so on. In one embodiment, the telescoping rod includes a handle 306 at an end of the telescoping rod 300 opposite to the end attached to the above-water lure retrieval attachment 100. Therefore, the telescoping rod 300 is able to be carried in a collapsed position for ease of carry and gradually extended to reach a lure during use.

Figure 14:
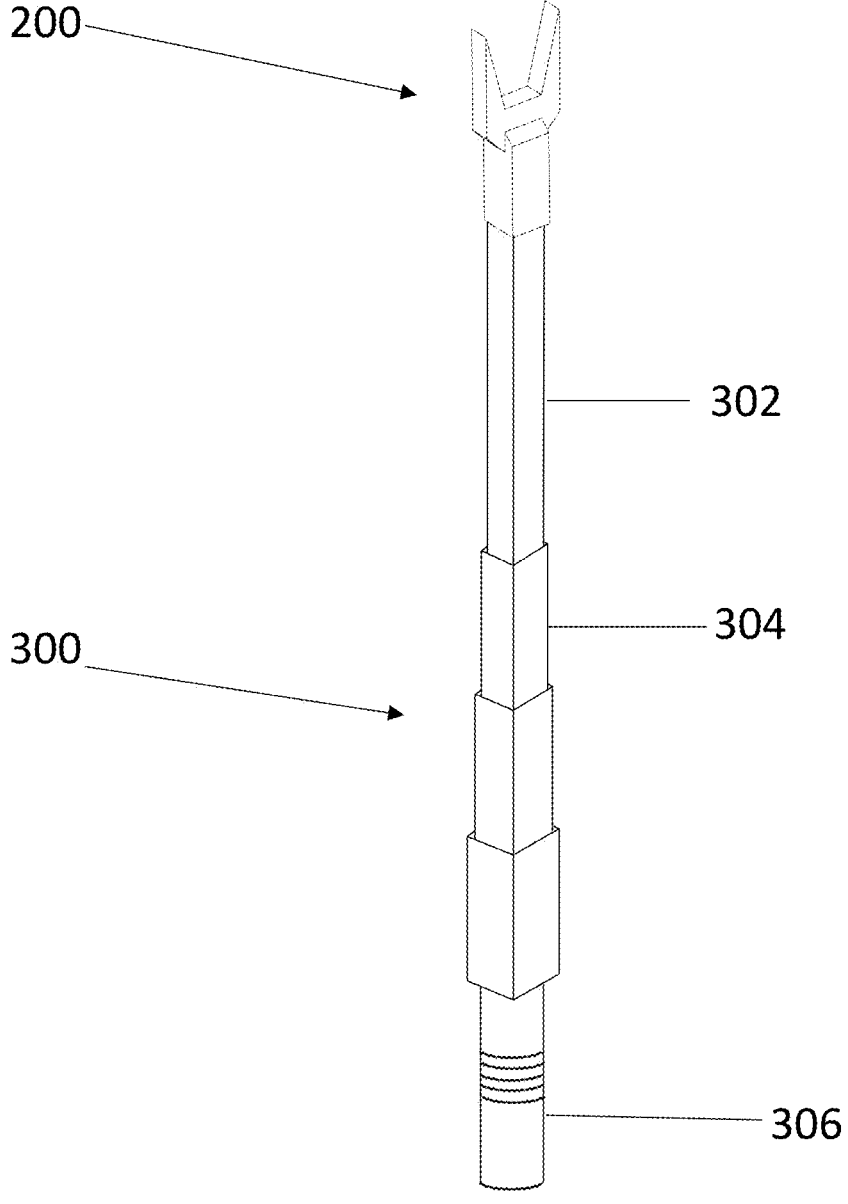
FIG. 14 illustrates a below-water lure retrieval attachment attached to a telescoping rod according to one embodiment of the present invention.

FIG. 14 illustrates a below-water lure retrieval attachment attached to a telescoping rod according to one embodiment of the present invention. In one embodiment, a below-water lure retrieval attachment 200 is attached to one end of a telescoping rod 300. The telescoping rod 300 includes a first extended member 302 operable to slip into or out of a second extended member 304. In one embodiment, the second extended member 304 is able to slip into or out of a third extended member and so on. In one embodiment, the telescoping rod includes a handle 306 at an end of the telescoping rod 300 opposite to the end attached to the below-water lure retrieval attachment 200. Therefore, the telescoping rod 300 is able to be carried in a collapsed position for ease of carry and gradually extended to reach a lure during use.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A fishing lure retrieval device comprising:
a body; and
an attachment portion,
wherein a first end of the body is attached to a first end of the attachment portion;
wherein the body includes at least three protrusions extending from a side surface of the body and configured to frictionally engage with one or more hooks of a fishing lure;
wherein the at least three protrusions are located at varying positions along a length of the body;
wherein the body includes a surface between each of the at least three protrusions configured to frictionally engage with the one or more hooks on the fishing lure;
wherein the surface includes hook and loop elements for grabbing the one or more hooks on the fishing lure;
wherein the body includes an L-shaped line-guide protrusion extending orthogonally from an opposite side of the body from the at least three protrusions;
wherein the body includes a recessed blade partially exposed in an opening at a second end of the body opposite to the first end of the body;
wherein the recessed blade is configured to cut a portion of a fishing line;
wherein the attachment portion is configured to attach to a rod to provide extended reach for the fishing lure retrieval device; and
wherein each of the at least three protrusions include at least five openings, wherein each of the at least five openings are of varying widths.

2. The device of claim 1, wherein the at least three protrusions configured to frictionally engage with the one or more hooks of the fishing lure are orthogonally attached to the body.

3. The device of claim 1, wherein the at least three protrusions configured to frictionally engage with the one or more hooks of the fishing lure include a main rectangular component parallel to a first surface of the body and additional rectangular components perpendicular to the first surface of the body and perpendicular to the main rectangular component.

4. The device of claim 1, wherein the device does not include a magnet.

5. The device of claim 1, wherein the body is tapered at the second end of the body.

6. The device of claim 1, wherein the rod is not a fishing rod.

7. A fishing lure retrieval device comprising:
a body including at least one protrusion distributed along a length of the body, configured to frictionally engage with one or more hooks of a fishing lure;
wherein the at least one protrusion includes at least five openings, wherein each of the at least five openings are of varying widths;
wherein the body includes a surface proximate to the at least one protrusion configured to frictionally engage with the one or more hooks on the fishing lure;
wherein the surface includes hook and loop elements for grabbing the one or more hooks on the fishing lure;
wherein the body includes a recessed blade;
wherein the recessed blade is configured to cut a fishing line; and
wherein the at least one protrusion configured to frictionally engage with the one or more hooks of the fishing lure includes a main rectangular component parallel to a first surface of the body and additional rectangular components perpendicular to the first surface of the body and perpendicular to the main rectangular component.

8. The device of claim 7, wherein the at least one protrusion configured to frictionally engage with the one or more hooks of the fishing lure is orthogonally attached to the body.

9. The device of claim 7, wherein the body further comprises a line guide protrusion on an opposite side of the body from the at least one protrusion configured to frictionally engage with the one or more hooks of the fishing lure.

10. The device of claim 9, wherein the line guide protrusion is an L-shaped component.

11. The device of claim 7, wherein the surface has a higher coefficient of friction than other portions of the body.

12. The device of claim 7, wherein the device does not include a magnet.

13. A fishing lure retrieval device comprising:
a body; and
an attachment portion;
wherein a first end of the body is attached to a first end of the attachment portion;
wherein the body includes a flat base portion and two prongs extending forward from opposite sides of a second end that is opposite of the first end of the body to form a fork shape;
wherein the attachment portion includes a hole defined at a second end that is opposite of the first end of the attachment portion to attach to a rod to provide extended reach;
wherein the attachment portion includes an L-shaped line-guide protrusion extending from a side surface of the attachment portion;
wherein the flat base portion includes one or more embedded base ferromagnets; and wherein the two prongs include one or more embedded prong ferromagnets operable to attach to a lure.

\* \* \* \* \*